UNITED STATES PATENT OFFICE.

OTTO GRAUL AND GOTTFRIED HANSCHKE, OF LUDWIGSHAFEN-ON-THE-RHINE, AND FRANZ WEBEL, OF MANNHEIM, GERMANY, ASSIGNORS, BY MESNE ASSIGNMENTS, TO ALIEN PROPERTY CUSTODIAN.

PRODUCING ISOPRENE.

1,298,929. Specification of Letters Patent.  Patented Apr. 1, 1919.

No Drawing.   Application filed February 5, 1912.   Serial No. 675,656.

*To all whom it may concern:*

Be it known that we, OTTO GRAUL, GOTTFRIED HANSCHKE, and FRANZ WEBEL, subjects, respectively, of the Grand Duke of Anhalt, of the King of Prussia, and of the King of Bavaria, residing, respectively, the first two at Ludwigshafen-on-Rhine and the third at Mannheim, Germany, have invented new and useful Improvements in Producing Isoprene, of which the following is a specification.

We have discovered that we can obtain isoprene while starting from a mineral product which is available in any quantity desired, viz. from isopentane, in an excellent yield and in a pure condition as hereinafter described. According to our invention isopentane is first treated with a halogenizing agent, so as to introduce one atom of halogen into the isopentane molecule, and then the product (which generally consists of a mixture of two mono-halogen isopentanes) is treated with an agent which will split off halogen hydrid, homogeneous trimethylethylene being the result. This homogeneous trimethyl-ethylene can be obtained directly from the mixture of mono-halogen isopentanes owing to the surprising action of said agent which both splits off the halogen hydrid and also causes the re-arrangement of isomeres formed to take place. The trimethyl-ethylene thus obtained is then treated with a halogenizing agent, so that one molecular proportion of halogen is added, and the iso-amylene-dihalogenid thus produced is then treated with an agent which is capable of splitting off two molecular proportions of halogen hydrid. Agents splitting off halogen hydrid either chemically or by catalytic action are suitable in this and also in the former stage of the process.

This transformation of dimethyl-allene is described in detail and claimed in the specification of U. S. Patent 1,083,164, consequently we do not claim in this application this step by itself.

The following example will serve to illustrate further the nature of our invention, which, however, is not confined to this example, and how it can be carried into practical effect.

Mix an excess of isopentane vapor with gaseous chlorin in a vessel which is impervious to light and lead the mixture to a second vessel in which the gases are exposed to the action of the rays from a mercury lamp. This second vessel should be provided with an outlet for the hydrochloric acid formed and also with an arrangement for returning unaltered isopentane to be reacted upon again, while the crude chlor-isopentane can be drawn off and, if desired, can be subjected to distillation. Then, at a temperature of about four hundred and fifty degrees centigrade, pass the mono-chlor-isopentane through a tube filled with an excess of granulated caustic lime, whereupon hydrochloric acid is split off and trimethyl-ethylene is produced in very good yield, isomeric olefins formed being converted in the same operation into trimethyl-ethylene by the action of the hot lime. The trimethyl-ethylene is then treated with bromin and thus converted into the dibromid, which is passed slowly over catalytic material, such for instance as barium chlorid or aluminium oxid, at a pressure of about 20 millimeters of mercury and at a temperature of about 350° C. Extract, by means of alkali, the hydrobromic acid from the vapors obtained and then pass the remainder through a cooled vessel in order to condense the isoprene.

Now what we claim is:—

1. The process of producing isoprene which consists in treating isopentane with a halogenating agent until a mono-halogen compound thereof is obtained, treating the mono-halogen compound with a body which is capable of splitting off halogen hydrid, then treating the product with a halogen, so as to produce dihalogen isopentane, then treating this product with a body capable of splitting off halogen hydrid.

2. The process of producing isoprene by monochlorinating isopentane, isolating the monochlor isopentane from unaltered isopentane, then heating the monochlor isopentane with an excess of caustic lime, then treating the trimethyl-ethylene with bromin, and then passing the trimethyl-ethylene dibromid over heated barium chlorid.

In testimony whereof we have hereunto set our hands in the presence of two subscribing witnesses.

OTTO GRAUL.
GOTTFRIED HANSCHKE.
FRANZ WEBEL.

Witnesses:
J. ALEC LLOYD,
A. O. TITTMAN.